United States Patent
Tanaka

(10) Patent No.: US 11,784,521 B2
(45) Date of Patent: Oct. 10, 2023

(54) ROTOR AND ROTARY ELECTRIC MACHINE

(71) Applicant: Nidec Corporation, Kyoto (JP)

(72) Inventor: Kuniaki Tanaka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/520,776

(22) Filed: Nov. 8, 2021

(65) Prior Publication Data

US 2022/0166272 A1 May 26, 2022

(30) Foreign Application Priority Data

Nov. 25, 2020 (JP) ................................ 2020-195512

(51) Int. Cl.
*H02K 1/27* (2022.01)
*H02K 1/28* (2006.01)
*H02K 1/276* (2022.01)
*H02K 21/14* (2006.01)
*H02K 29/03* (2006.01)

(52) U.S. Cl.
CPC .......... *H02K 1/2766* (2013.01); *H02K 21/14* (2013.01); *H02K 29/03* (2013.01)

(58) Field of Classification Search
CPC ...... H02K 1/2766; H02K 21/14; H02K 29/03; H02K 21/16; H02K 2213/03; H02K 1/06; H02K 1/27
See application file for complete search history.

(56) References Cited

U.S. PATENT DOCUMENTS

| | | |
|---|---|---|
| 7,151,335 B2 | 12/2006 | Tajima et al. |
| 10,594,177 B2 | 3/2020 | Nakagawa et al. |
| 2005/0200223 A1* | 9/2005 | Tajima ................. H02K 1/2766 310/156.55 |
| 2007/0126305 A1* | 6/2007 | Okuma ................ H02K 1/2766 310/156.53 |
| 2010/0166575 A1* | 7/2010 | Fukuda .................. H02K 1/276 310/216.106 |

FOREIGN PATENT DOCUMENTS

| | | |
|---|---|---|
| JP | 2015-208184 A | 11/2015 |
| JP | 2017-123779 A | 7/2017 |
| WO | 2019/202943 A1 | 10/2019 |

OTHER PUBLICATIONS

Official Communication issued in corresponding Chinese Patent Application No. 202111411074.0, dated Aug. 18, 2023.

* cited by examiner

*Primary Examiner* — Thomas Truong
(74) *Attorney, Agent, or Firm* — KEATING & BENNETT

(57) ABSTRACT

A rotor includes a shaft, a rotor core including a pair of accommodation holes, and a pair of magnets accommodated in the pair of accommodation holes. The pair of magnets extend in directions away from each other in a circumferential direction from the radially inside toward the radially outside. A flux barrier is radially outside the magnet. The rotor core includes a first gap between magnetic poles adjacent to each other in the circumferential direction. The first gap is sandwiched between the flux barriers of the magnetic poles adjacent to each other in the circumferential direction. A radially outside surface of the rotor core includes a pair of core recesses provided in a portion located on the radially outside of the flux barrier and a core protrusion located between the pair of core recesses in the circumferential direction.

8 Claims, 7 Drawing Sheets

ROTOR AND ROTARY ELECTRIC MACHINE

CROSS-REFERENCE TO RELATED APPLICATIONS

The present application claims priority under 35 U.S.C. § 119 to Japanese Patent Application No. 2020-195512, filed on Nov. 25, 2020, the entire contents of which are hereby incorporated herein by reference.

1. FIELD OF THE INVENTION

The present disclosure relates to a rotor and a rotary electric machine.

2. BACKGROUND

There is known a rotary electric machine including a rotor core and a magnet disposed in an accommodation hole provided in the rotor core. For example, a rotary electric machine including a pair of permanent magnets arranged in a substantially V-shape opened toward an outer peripheral side in an axis orthogonal section is known.

In the rotor of the rotary electric machine as described above, for the purpose of reducing a torque ripple and the like, sometimes a flux barrier is provided on a radially outside of the magnet and a recess is provided on an outer peripheral surface of the rotor core located on the radially outside of the flux barrier. In such a case, a portion between the flux barrier and the recess becomes thin, and there is a fear that rigidity of the rotor core is reduced.

SUMMARY

One example embodiment of a rotor of the present disclosure is a rotor rotatable about a center axis extending in an axial direction, the rotor including a shaft extending in the axial direction, a rotor core that includes accommodation holes and is fixed to the shaft, and magnets accommodated in the accommodation holes. The accommodation holes include a pair of accommodation holes arranged at intervals in a circumferential direction. The pair of accommodation holes extend in directions away from each other in the circumferential direction from a radially inside toward a radially outside when viewed in the axial direction. The magnets include a pair of magnets accommodated in the pair of accommodation holes. The pair of magnets extend in the directions away from each other in the circumferential direction from the radially inside toward the radially outside when viewed in the axial direction. A flux barrier is provided on the radially outside of the magnet along a direction in which the magnet extends when viewed in the axial direction with respect to each of the pair of magnets in the pair of accommodation holes. Magnetic poles including the pair of magnets and the flux barrier are provided along the circumferential direction. The rotor core includes a first gap located between the magnetic poles adjacent to each other in the circumferential direction. The first gap is circumferentially sandwiched between the flux barriers included in the magnetic poles adjacent to each other in the circumferential direction. A radially outside surface of the rotor core includes a core recess provided in each of portions located on the radially outsides of the pair of flux barriers sandwiching the first gap in the circumferential direction, and a core protrusion located between a pair of the core recesses located radially outside the pair of flux barrier portions in the circumferential direction. The first gap includes a widened portion in which a circumferential dimension increases toward the radially outside. A radially outer end of the widened portion is connected to a second gap located between the core recess and the flux barrier in the radial direction.

One example embodiment of a rotary electric machine of the present disclosure includes the rotor and a stator located radially outside the rotor.

The above and other elements, features, steps, characteristics and advantages of the present disclosure will become more apparent from the following detailed description of the example embodiments with reference to the attached drawings.

DETAILED DESCRIPTION

A Z-axis direction appropriately illustrated in each drawing is a vertical direction in which a positive side is an "upper side" while a negative side is a "lower side". A center axis J appropriately illustrated in each drawing is a virtual line that is parallel to the Z-axis direction and extends in the vertical direction. In the following description, an axial direction of the center axis J, namely, a direction parallel to the vertical direction is simply referred to as an "axial direction", a radial direction centered on the center axis J is simply referred to as a "radial direction", and a circumferential direction centered on the center axis J is simply referred to as a "circumferential direction". An arrow θ appropriately illustrated in each drawing indicates the circumferential direction. The arrow θ is directed in a clockwise direction around the center axis J when viewed from above. In the following description, a side on which the arrow θ is directed in the circumferential direction with a certain object as a reference, namely, a side traveling in the clockwise direction as viewed from an upper side is referred to as "one side in the circumferential direction", and a side opposite to the side on which the arrow θ is directed in the circumferential direction with the certain object as the reference, namely, a side traveling in the counterclockwise direction as viewed from the upper side is referred to as "the other side in the circumferential direction".

The vertical direction, the upper side, and the lower side are merely names for describing a relative positional relationship between the respective units, and an actual layout relationship and the like may be other than the layout relationship indicated by these names.

Figure 1:
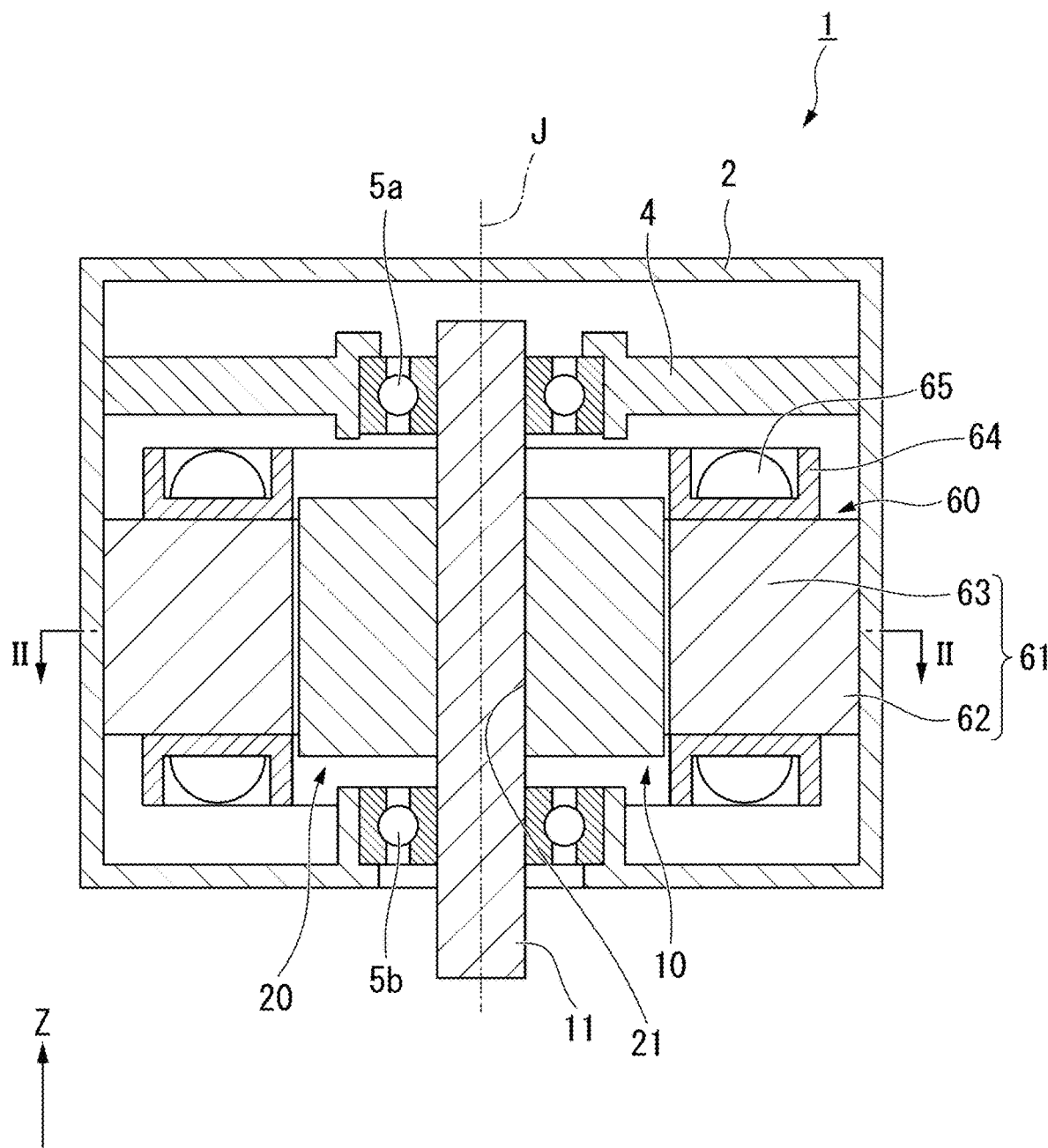
FIG. 1 is a sectional view illustrating a rotary electric machine according to an example embodiment of the present disclosure.

As illustrated in FIG. 1, a rotary electric machine 1 according to an example embodiment is an inner rotor type rotary electric machine. In the example embodiment, the rotary electric machine 1 is a motor. The rotary electric machine 1 includes a housing 2, a rotor 10, a stator 60, a bearing holder 4, and bearings 5a, 5b. The housing 2 accommodates the rotor 10, the stator 60, the bearing holder 4, the bearings 5a, 5b. A bottom portion of the housing 2 holds the bearing 5b. The bearing holder 4 holds the bearing 5a. For example, each of the bearings 5a, 5b is a ball bearing.

The stator 60 faces the rotor 10 with a gap interposed therebetween. The stator 60 is disposed radially outside the rotor 10. The stator 60 includes a stator core 61, an insulator 64, and a plurality of coils 65. The stator core 61 includes an annular core-back 62 and a plurality of teeth 63 that protrude radially inside from the core-back 62. The plurality of coils 65 are installed to the plurality of teeth 63 with the insulator 64 interposed therebetween.

Figure 2:
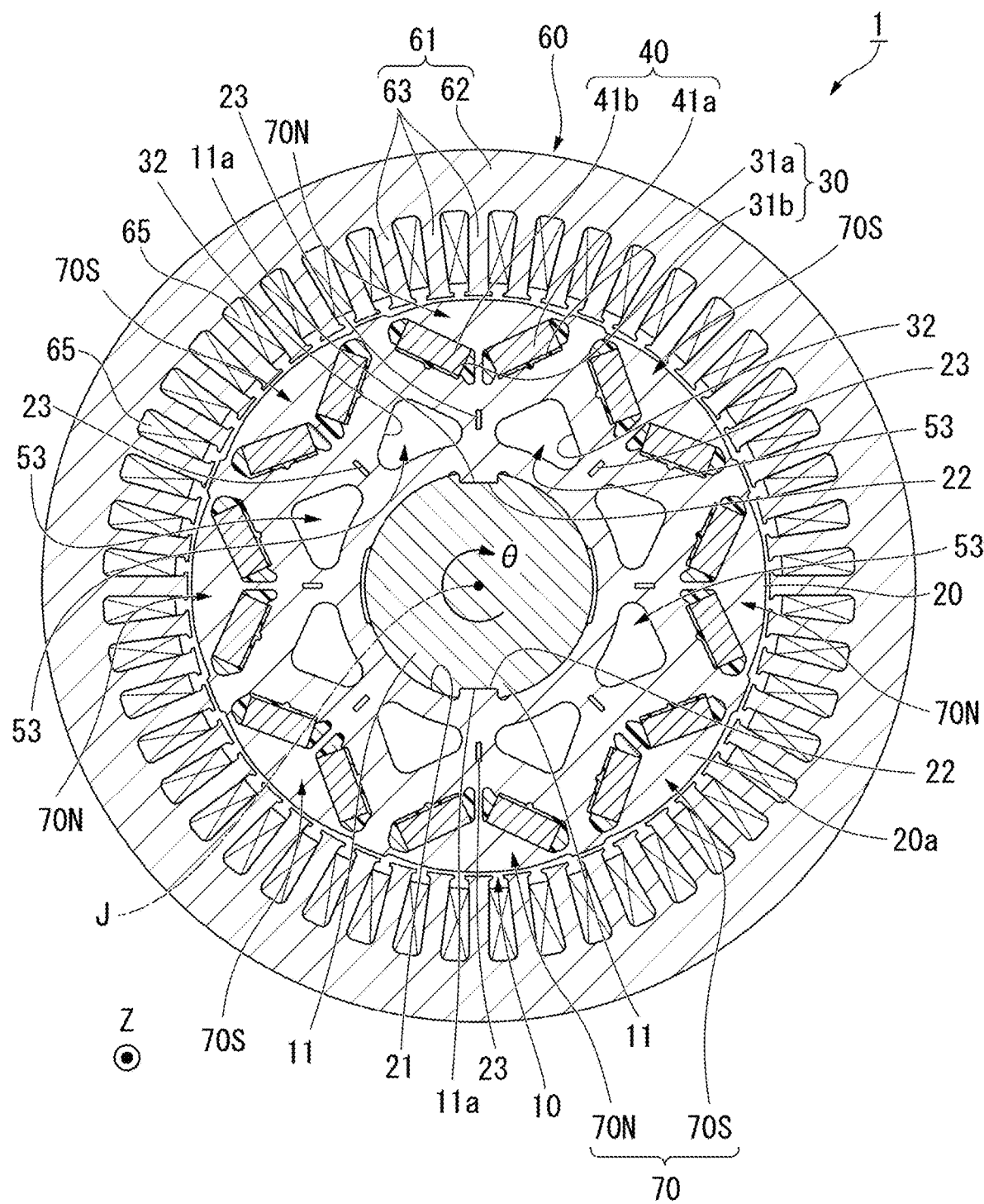
FIG. 2 is a sectional view illustrating a portion of the rotary electric machine of an example embodiment of the present disclosure, and is a sectional view taken along a line II-II in FIG. 1.

The rotor 10 is capable of rotating about a center axis J extending in the axial direction. As illustrated in FIG. 2, the rotor 10 includes a shaft 11, a rotor core 20, and a plurality of magnets 40. The shaft 11 has a columnar shape that extends in the axial direction while being centered on the center axis J. The shaft 11 include a recess 11a recessed in the radial direction. The recess 11a is recessed radially inside from an outer peripheral surface of the shaft 11. In the example embodiment, two recesses 11a are provided across the center axis J in the radial direction. Although not illustrated, for example, the recess 11a extends in the axial direction. As illustrated in FIG. 1, the shaft 11 is rotatably supported about the center axis J by bearings 5a, 5b.

The rotor core 20 is a magnetic material. The rotor core 20 is fixed to the outer peripheral surface of the shaft 11. The rotor core 20 includes a central hole 21 axially penetrating the rotor core 20. As illustrated in FIG. 2, the central hole 21 has a substantially circular shape centered on the center axis J when viewed in the axial direction. The shaft 11 passes through the central hole 21. The central hole 21 includes a protrusion 22 protruding in the radial direction. The protrusion 22 protrudes radially inside from the inner peripheral surface of the central hole 21. In the example embodiment, two protrusions 22 are provided across the center axis J in the radial direction. The two protrusions 22 are fitted into the two recesses 11a. The protrusion 22 is hooked on the recess 11a in the circumferential direction. As a result, relative rotation between the shaft 11 and the rotor core 20 in the circumferential direction is prevented. For example, the protrusion 22 is press-fitted into the recess 11a.

The rotor core 20 includes a plurality of accommodation holes 30 located radially outside the central hole 21. For example, the plurality of accommodation holes 30 penetrates the rotor core 20 in the axial direction. A plurality of magnets 40 are accommodated in the plurality of accommodation holes 30, respectively. A method for fixing the magnet 40 in the accommodation hole 30 is not particularly limited. In the example embodiment, the magnet 40 is fixed in the accommodation hole 30 by filling a portion other than a portion where the magnet 40 is located in the accommodation hole 30 with resin. The plurality of accommodation holes 30 include a pair of accommodation holes 31a, 31b.

The type of the plurality of magnets 40 is not particularly limited. For example, the magnet 40 may be a neodymium magnet or a ferrite magnet. The plurality of magnets 40 include a pair of magnets 41a, 41b.

In the example embodiment, a plurality of the pair of accommodation holes 31a, 31b and a plurality of the pair of magnets 41a, 41b are provided at intervals in the circumferential direction. For example, eight each of the pair of accommodation holes 31a, 31b and the pair of magnets 41a, 41b are provided.

The rotor 10 is provided with a plurality of magnetic poles 70 each including the pair of accommodation holes 31a, 31b and the pair of magnets 41a, 41b along the circumferential direction. For example, eight magnetic poles 70 are provided. For example, the plurality of magnetic poles 70 are arranged at equal intervals over an entire circumference along the circumferential direction. The plurality of magnetic poles 70 includes a plurality of magnetic poles 70N in which the magnetic pole on the outer peripheral surface of the rotor core 20 is an N pole and a plurality of magnetic poles 70S in which the magnetic pole on the outer peripheral surface of the rotor core 20 is an S pole. For example, four magnetic poles 70N and four magnetic poles 70S are provided. The four magnetic poles 70N and the four magnetic poles 70S are alternately arranged along the circumferential direction. The configuration of each magnetic pole 70 is similar to each other except that the magnetic poles on the outer peripheral surface of the rotor core 20 are different and that the circumferential positions are different.

Figure 3:
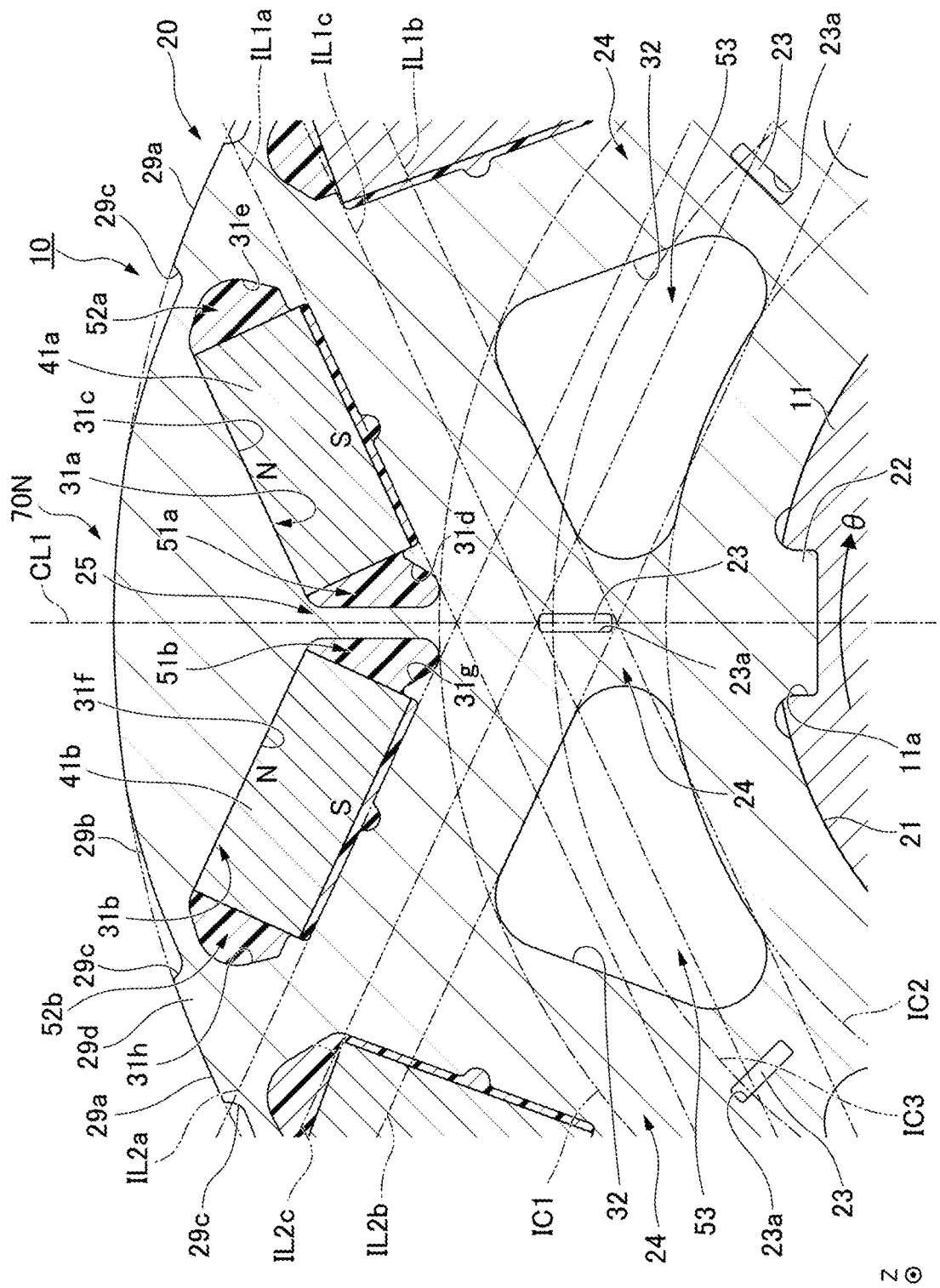
FIG. 3 is a sectional view illustrating a magnetic pole of an example embodiment of the present disclosure.

As illustrated in FIG. 3, in the magnetic pole 70, the pair of accommodation holes 31a, 31b is disposed at intervals in the circumferential direction. For example, the accommodation hole 31a is located on one side (+θ side) in the circumferential direction of the accommodation hole 31b. For example, the accommodation holes 31a, 31b extend substantially linearly in a direction inclined obliquely with respect to the radial direction when viewed in the axial direction. The pair of accommodation holes 31a, 31b extends in directions away from each other in the circumferential direction from the radially inside toward the radially outside when viewed in the axial direction. That is, a circumferential distance between the accommodation hole 31a and the accommodation hole 31b increases from the radially inside toward the radially outside. For example, the accommodation hole 31a is located on one side in the circumferential direction from the radially inside toward the radially outside. For example, the accommodation hole 31b is located on the other side (−θ side) in the circumferential direction from the radially inside toward the radially outside. For example, the pair of accommodation holes 31a, 31b is disposed along a V-shape expanding in the circumferential direction toward the radially outside when viewed in the axial direction. Radially outer ends of the accommodation holes 31a, 31b are located at a radially outer edge of the rotor core 20.

For example, the accommodation hole 31a and the accommodation hole 31b are disposed with a magnetic pole center line CL1 in FIG. 3 interposed therebetween in the circumferential direction when viewed in the axial direction. The magnetic pole center line CL1 is a virtual line that passes through the circumferential center of the magnetic pole 70 and the center axis J and extends in the radial direction. For example, the accommodation hole 31a and the accommodation hole 31b are arranged line-symmetrically with respect to the magnetic pole center line CL1 when viewed in the axial direction.

Hereinafter, the description of the accommodation hole 31b may be omitted for the same configuration as the accommodation hole 31a except for the line symmetry with respect to the magnetic pole center line CL1. In the following description, in each magnetic pole, the side approaching the magnetic pole center line CL1 in the circumferential direction with respect to a certain object is referred to as a "circumferential inside".

The accommodation hole 31a includes a main body 31c, an inner end 31d, and an outer end 31e. The main body 31c extends linearly in the direction in which the accommodation hole 31a extends when viewed in the axial direction. For example, the main body 31c has a rectangular shape when viewed in the axial direction. The inner end 31d is connected to a radially inside end of the main body 31c. The inner end 31d is a radially inside end of the accommodation hole 31a. The outer end 31e is connected to the radially outer end of the main body 31c. The outer end 31e is a radially outer end of the accommodation hole 31a. The accommodation hole 31b includes a main body 31f, an inner end 31g, and an outer end 31h.

The pair of magnets 41a, 41b is accommodated in the pair of accommodation holes 31a, 31b, respectively. The magnet 41a is accommodated in the accommodation hole 31a. The magnet 41b is accommodated in the accommodation hole 31b. For example, the pair of magnets 41a, 41b has a rectangular shape when viewed in the axial direction. Although not illustrated, for example, the magnets 41a, 41b have a rectangular parallelepiped shape. Although not illustrated, for example, the magnets 41a, 41b are provided over the entire axial direction in the accommodation holes 31a, 31b. The pair of magnets 41a, 41b is disposed at intervals in the circumferential direction. For example, the magnet 41a is located on one side (+θ side) in the circumferential direction of the magnet 41b.

The magnet 41a extends along the accommodation hole 31a when viewed in the axial direction. The magnet 41b extends along the accommodation hole 31b when viewed in the axial direction. For example, the magnets 41a, 41b extend substantially linearly in a direction inclined obliquely with respect to the radial direction when viewed in the axial direction. The pair of magnets 41a, 41b extends in directions away from each other in the circumferential direction from the radially inside toward the radially outside when viewed in the axial direction. That is, the circumferential distance between the magnet 41a and the magnet 41b increases from the radially inside toward the radially outside.

For example, the magnet 41a is located on one side (+θ side) in the circumferential direction from the radially inside toward the radially outside. For example, the magnet 41b is located on the other side (-θ side) in the circumferential direction from the radially inside toward the radially outside. For example, the pair of magnets 41a, 41b is arranged along the V-shape expanding in the circumferential direction toward the radially outside when viewed in the axial direction.

For example, an opening angle between the magnet 41a and the magnet 41b disposed along the V-shape when viewed in the axial direction is an obtuse angle. For example, the magnet 41a and the magnet 41b are disposed with the magnetic pole center line CL1 interposed therebetween in the circumferential direction when viewed in the axial direction. For example, the magnet 41a and the magnet 41b are arranged line-symmetrically with respect to the magnetic pole center line CL1 when viewed in the axial direction. Hereinafter, the description of the magnet 41b may be omitted for the same configuration as the magnet 41a except that the magnet is line-symmetric with respect to the magnetic pole center line CL1.

The magnet 41a is fitted in the accommodation hole 31a. More specifically, the magnet 41a is fitted in the main body 31c. Among side surfaces of the magnet 41a, a radially outer surface in the direction orthogonal to the direction in which the main body 31c extends is in contact with the inside surface of the main body 31c. Among the side surfaces of the magnet 41a, a radially inside surface in the direction orthogonal to the direction in which the main body 31c extends is disposed while separated radially outside from the inside surface of the main body 31c. For example, a gap between the radially inside surface in the direction orthogonal to the direction in which the main body 31c extends in the side surfaces of the magnet 41a and the inside surface of the main body 31c is filled with resin.

When viewed in the axial direction, both end portions in the extending direction of the magnet 41a are disposed away from both end portions in the extending direction of the accommodation hole 31a. When viewed in the axial direction, the inner end 31d and the outer end 31e are disposed adjacent to each other on both sides of the magnet 41a in the direction in which the magnet 41a extends.

The inner end 31d is filled with resin to form a first flux barrier 51a. The first flux barrier 51a is a flux barrier provided on the radially inside of the magnet 41a along the direction in which the magnet 41a extends when viewed in the axial direction. The outer end 31e is filled with resin to form a second flux barrier 52a. The second flux barrier 52a is a flux barrier provided on the radially outside of the magnet 41a along the direction in which the magnet 41a extends when viewed in the axial direction. That is, the rotor core 20 includes the first flux barrier 51a and the second flux barrier 52a arranged with the magnet 41a interposed therebetween in the direction in which the magnet 41a extends when viewed in the axial direction. The rotor core 20 includes a first flux barrier 51b and a second flux barrier 52b arranged with the magnet 41b interposed therebetween in the direction in which the magnet 41b extends when viewed in the axial direction.

As described above, in the pair of accommodation holes 31a, 31b, the first flux barriers 51a, 51b are provided for the pair of magnets 41a, 41b on the radially inside of the magnets 41a, 41b along the direction in which the magnets 41a, 41b extend when viewed in the axial direction, and the second flux barriers 52a, 52b are provided for the pair of magnets 41a, 41b on the radially outside of the magnets 41a, 41b along the direction in which the magnets 41a, 41b extend when viewed in the axial direction. Each of the pair of first flux barriers 51a, 51b and the pair of second flux barriers 52a, 52b is included in each magnetic pole 70.

In the description, the "direction in which the magnet extends when viewed in the axial direction" is a direction in which a long side of a rectangular magnet extends when the magnet has a rectangular shape as viewed in the axial direction, for example, like the magnets 41a, 41b of the example embodiment. That is, in the example embodiment, the direction in which the magnet 41a extends when viewed in the axial direction is the direction in which the long side of the rectangular magnet 41a extends when viewed in the axial direction. The direction in which the magnet 41b extends is a direction in which a long side of the rectangular magnet 41b extends when viewed in the axial direction.

In the description, the "flux barrier" is a portion capable of preventing the flow of magnetic flux. That is, the magnetic flux hardly passes through each flux barrier. Each flux barrier is not particularly limited as long as the flux barrier can prevent the flow of the magnetic flux, and may include a void or a non-magnetic portion other than resin.

The magnetic pole of the magnet 41a is disposed along the direction orthogonal to the direction in which the magnet 41a extends when viewed in the axial direction. The magnetic pole of the magnet 41b is disposed along the direction orthogonal to the direction in which the magnet 41b extends when viewed in the axial direction. The magnetic pole located on the radially outside in the magnetic poles of the magnet 41a and the magnetic pole located on the radially outside in the magnetic poles of the magnet 41b are the same. The magnetic pole located on the radially inside in the magnetic poles of the magnet 41a and the magnetic pole located on the radially inside in the magnetic poles of the magnet 41b are the same.

In the magnetic pole 70N, for example, the magnetic pole located on the radially outside in the magnetic poles of the magnet 41a and the magnetic pole located on the radially outside of the magnetic poles of the magnet 41b are the N pole. In the magnetic pole 70N, for example, the magnetic pole located on the radially inside of the magnetic poles of the magnet 41a and the magnetic pole located on the radially inside of the magnetic poles of the magnet 41b are the S pole.

Although not illustrated, in the magnetic pole 70S, the magnetic pole of each magnet 40 is disposed while inverted with respect to the magnetic pole 70N. That is, in the magnetic pole 70S, for example, the magnetic pole located on the radially outside in the magnetic poles of the magnet 41a and the magnetic pole located on the radially outside in the magnetic poles of the magnet 41b are the S pole. In the magnetic pole 70S, for example, the magnetic pole located on the radially inside in the magnetic poles of the magnet 41a and the magnetic pole located on the radially inside in the magnetic poles of the magnet 41b are the N pole.

The rotor core 20 has a plurality of third flux barriers 53 arranged at intervals in the circumferential direction. The plurality of third flux barriers 53 are flux barriers located radially outside the central hole 21 and radially inside the accommodation hole 30. In the example embodiment, the third flux barrier 53 is a through-hole 32 penetrating the rotor core 20 in the axial direction. As illustrated in FIG. 2, the plurality of third flux barriers 53 are arranged at equal intervals over the entire circumference along the circumferential direction. For example, eight third flux barriers 53 are provided. The third flux barrier 53 may be formed by filling resin in the through-hole 32 axially penetrating the rotor core 20.

The circumferential position of each of the third flux barrier 53 is a circumferential position between the magnetic poles 70 adjacent to each other in the circumferential direction. For example, the circumferential center of the third flux barrier 53 is the same circumferential position as the circumferential center between the magnetic poles 70 adjacent to each other in the circumferential direction. The third flux barrier 53 is disposed across the radially inside of the accommodation hole 31a in one of the magnetic poles 70 adjacent to each other in the circumferential direction and the radially inside of the accommodation hole 31b in the other magnetic pole 70.

In the example embodiment, the third flux barrier 53 has a rounded triangular shape convex outward in the radially direction when viewed in the axial direction. As illustrated in FIG. 3, for example, both edges of the third flux barrier 53 in the circumferential direction extend in parallel with the direction in which the magnet 40 accommodated in the accommodation hole 30 located on the radially outside of each edge as viewed in the axial direction extends. For example, the radially inside edge of the third flux barrier 53 has an arc shape centered on the center axis J.

Figure 4:
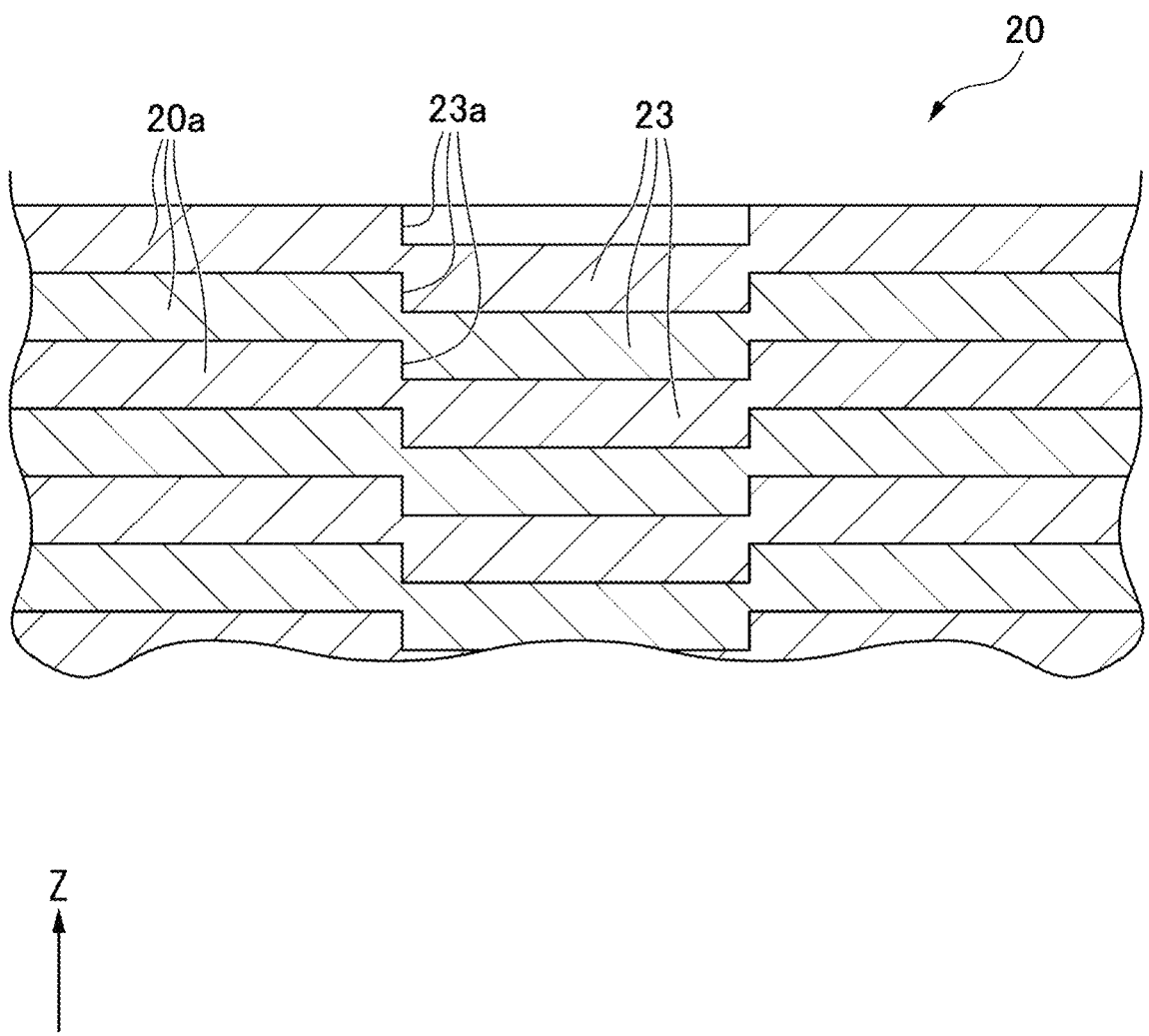
FIG. 4 is a sectional view illustrating a part of a rotor core of an example embodiment of the present disclosure.

As illustrated in FIG. 4, the rotor core 20 is formed by laminating a plurality of plate members 20a in the axial direction. The plate member 20a is a disk shape with a plate surface oriented toward the axial direction. For example, the plate member 20a is an electromagnetic steel plate. The plate member 20a includes a caulking portion 23 in which a part of the plate member 20a is caulked in the axial direction. In the example embodiment, the caulking portion 23 is a portion where a part of the plate member 20a is caulked from the upper side to the lower side by press working or the like. The caulking portion 23 protrudes downward on the lower surface of the plate member 20a. By forming the caulking portion 23, a caulking recess 23a recessed downward is provided on the upper surface of the plate member 20a.

The plate member 20a stacked adjacent to each other in the axial direction is fixed by fitting the caulking portion 23 of the plate member 20a located on the upper side into the caulking recess 23a of the plate member 20a located on the lower side. The plate members 20a stacked in this manner are fixed to each other by the caulking portion 23 in which a part of the plate member 20a is caulked. The caulking portion 23 has higher magnetic resistance than a portion of the rotor core 20 where the caulking portion 23 is not provided. That is, in the caulking portion 23, the magnetic flux is less likely to pass as compared with a portion of the rotor core 20 where the caulking portion 23 is not provided.

As illustrated in FIG. 3, in the example embodiment, the caulking portion 23 extends in the radial direction as viewed in the axial direction. For example, the caulking portion 23 has a rectangular shape elongated in the radial direction. The caulking portion 23 is located in a first region 24 between the third flux barriers 53 adjacent to each other in the circumferential direction. The first region 24 is a region in which the radial position is included in the radial position of the third flux barrier 53. The first region 24 is a region surrounded by each edge located on the side of the other third flux barrier 53 of the circumferential edges of the pair of third flux barriers 53 adjacent to each other in the circumferential direction, a virtual circle IC1, and a virtual circle IC2 when viewed in the axial direction.

The virtual circle IC1 is a virtual circle centered on the center axis J and in contact with the radially outer end of the third flux barrier 53. The virtual circle IC2 is a virtual circle centered on the center axis J and in contact with the radially inner end of the third flux barrier 53. In the example embodiment, the virtual circle IC2 overlaps an arc-shaped radially inside edge of the third flux barrier 53 when viewed in the axial direction. In the example embodiment, the radially outer portion of the first region 24 has a circumferential dimension increasing toward the radially outside. The first region 24 is provided between the third flux barriers 53 adjacent to each other in the circumferential direction. That is, a plurality of the first regions 24 are provided at intervals in the circumferential direction.

In the example embodiment, at least a part of the caulking portion 23 is located radially inside the radial center of the first region 24. The radial center of the first region 24 is located at the same radial position as the radial center of the third flux barrier 53. The radial center of the first region 24 is located on a virtual circle IC3 in FIG. 3. The virtual circle IC3 is a virtual circle passing through the radial center between the virtual circle IC1 and the virtual circle IC2. The virtual circle IC3 equally divides the space between the virtual circle IC1 and the virtual circle IC2 into two in the radial direction. At least a part of the caulking portion 23 is located radially inside the virtual circle IC3. In the example embodiment, a portion other than the radially outer end of the caulking portion 23 is located at the radial center of the first region 24, namely, on the radially inside of the virtual circle IC3. That is, in the example embodiment, the caulking portion 23 is disposed radially inside in the first region 24.

In the specification, "the caulking portion is disposed closer to the radially inside in the first region" means that the radial center of the caulking portion may be located on the radially inside with respect to the radial center of the first region.

The caulking portion 23 is located radially inside the second region 25 located between the radially inner ends of the pair of accommodation holes 31a, 31b. The second region 25 is a region between circumferentially inside edges of the pair of accommodation holes 31a, 31b in the rotor core 20. The second region 25 extends in the radial direction. The second region 25 radially connects a portion of the rotor core 20 located radially inside the pair of accommodation holes 31a, 31b and a portion of the rotor core 20 located radially outside the pair of accommodation holes 31a, 31b. For example, the circumferential dimension of the second region 25 is uniform except for both ends in the radial direction. The radially inner end of the second region 25 has the circumferential dimension increasing toward the radially inside. The radially outer end of the second region 25 has the circumferential dimension increasing toward the radially outside. The maximum dimension in the circumferential direction of the second region 25 is smaller than the minimum dimension in the circumferential direction of the first region 24.

In the specification, "a certain object is located radially inside another object" means that the certain object is located radially inside the other object, and that the circumferential position of at least a part of the certain object is included in the circumferential position of the other object. In the example embodiment, "the caulking portion 23 is located radially inside the second region 25" means that the caulking portion 23 is located radially inside the second region 25, and that the circumferential position of at least a part of the caulking portion 23 is included in the circumferential position of the second region 25. In the example embodiment, the entire circumferential position of the caulking portion 23 is included in the circumferential position of the second region 25.

The maximum dimension in the circumferential direction of the caulking portion 23 is smaller than the minimum dimension in the circumferential direction of the second region 25. The caulking portion 23 is disposed on an extension line on the radially inside of the second region 25. The caulking portion 23 is disposed on the magnetic pole center line CL1 when viewed in the axial direction. The magnetic pole center line CL1 passes through the circumferential center of the caulking portion 23 when viewed in the axial direction.

In the example embodiment, at least a part of the caulking portion 23 is located between a first virtual line IL1a that is parallel with a direction in which one accommodation hole 31a of the pair of accommodation holes 31a, 31b and is along a radially inside edge of one accommodation hole 31a extends and a second virtual line IL1b in parallel with the first virtual line IL1a and in contact with an edge of the third flux barrier 53 from the radially outside when viewed in the axial direction. The first virtual line IL1a extends along the radially inside edge of the main body 31c of the accommodation hole 31a when viewed in the axial direction. The first virtual line IL1a overlaps the radially inside edge of the main body 31c when viewed in the axial direction. The second virtual line IL1b extends along a circumferentially inside (−θ side) edge of the third flux barrier 53 located radially inside the accommodation hole 31a when viewed in the axial direction, and overlaps the edge. In the example embodiment, the entire caulking portion 23 is located between the first virtual line IL1a and the second virtual line IL1b in the radial direction.

In the example embodiment, at least a part of the caulking portion 23 is located radially inside a third virtual line IL1c that extends in parallel with the first virtual line IL1a and the second virtual line IL1b and bisects the first virtual line IL1a and the second virtual line IL1b as viewed in the axial direction. In the example embodiment, the entire caulking portion 23 is located radially inside the third virtual line IL1c. In the example embodiment, the entire caulking portion 23 is located between the second virtual line IL1b and the third virtual line IL1c in the radial direction.

The first virtual line IL2a, the second virtual line IL2b, and the third virtual line IL2c in FIG. 3 are provided similarly to the first virtual line IL1a, the second virtual line IL1b, and the third virtual line IL1c except that the first virtual line IL2a, the second virtual line IL2b, and the third virtual line IL2c are line-symmetric with the magnetic pole center line CL1 interposed therebetween with respect to the other accommodation hole 31b of the pair of accommodation holes 31a, 31b and the third flux barrier 53 located radially inside the accommodation hole 31b. The disposition relationship of the caulking portion 23 with respect to the first virtual line IL2a, the second virtual line IL2b, and the third virtual line IL2c is similar to the disposition relationship of the caulking portion 23 with respect to the first virtual line IL1a, the second virtual line IL1b, and the third virtual line IL1c except that the disposition relationship is line-symmetric with respect to the magnetic pole center line CL1.

A plurality of caulking portions 23 are provided for each plate member 20a. In each plate member 20a, the plurality of caulking portions 23 are arranged at equal intervals over the entire circumference along the circumferential direction. One caulking portion 23 is provided for each of the plurality of first regions 24.

In the example embodiment, the caulking portion 23 includes the caulking portion 23 located on the radially outside of the protrusion 22. As illustrated in FIG. 2, in the example embodiment, one caulking portion 23 is provided on the radially outside of each of the two protrusions 22 provided with the center axis J interposed therebetween in the radial direction.

In the specification, "a certain object is located on the radially outside of another object" means that the certain object is located on the radially outside of the other object, and that the circumferential position of at least a part of the certain object may be included in the circumferential position of the other object. That is, in the example embodiment, "the caulking portion 23 is located on the radially outside of the protrusion 22" means that the caulking portion 23 is located on the radially outside of the protrusion 22, and that the circumferential position of at least a part of the caulking portion 23 is included in the circumferential position of the second region 25. In the example embodiment, the entire circumferential position of the caulking portion 23 is included in the circumferential position of the protrusion 22. For example, the circumferential center of the caulking portion 23 and the circumferential center of the protrusion 22 have the same circumferential position.

Figure 5:
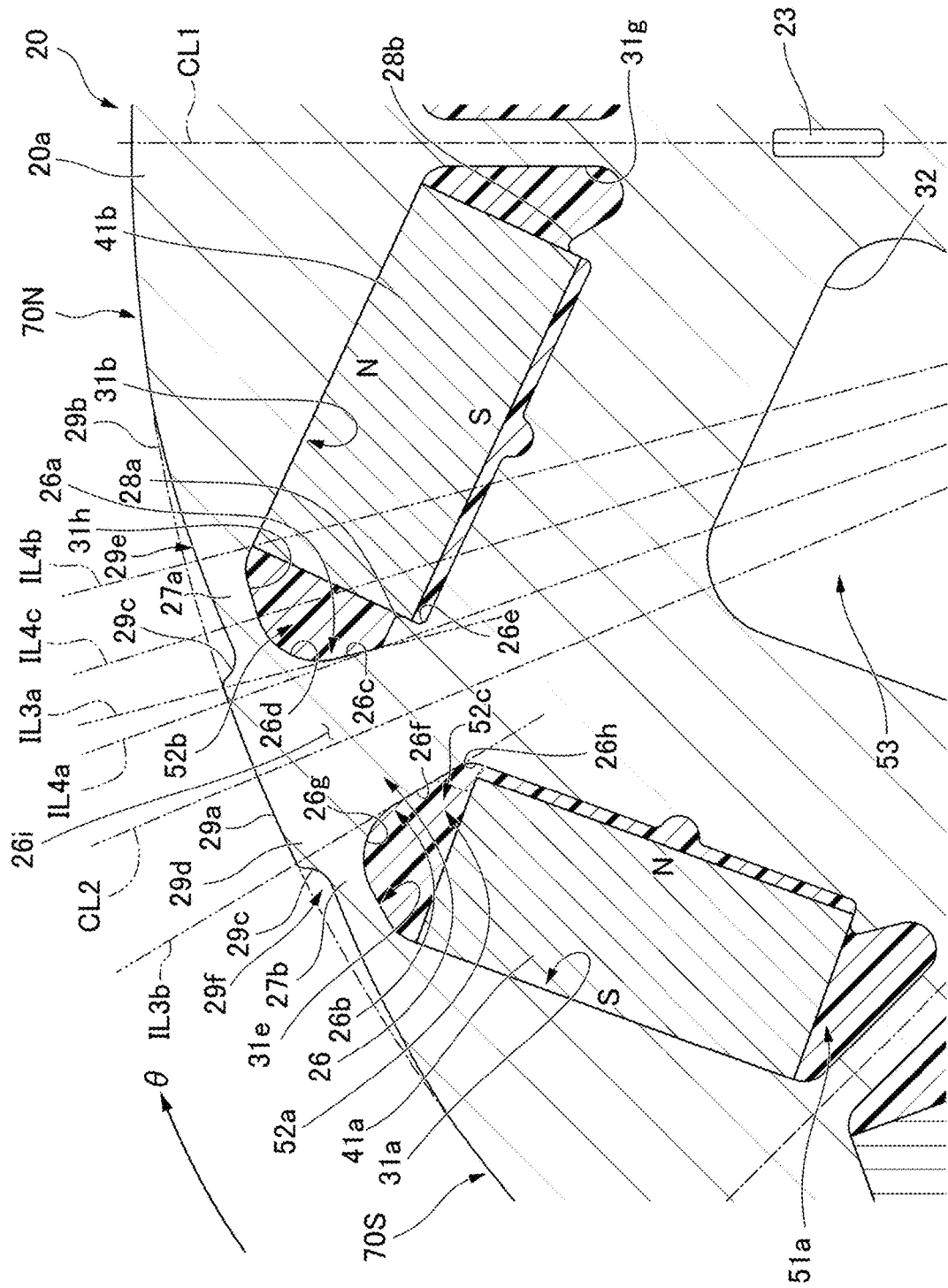
FIG. 5 is a sectional view illustrating a first gap and a second gap of an example embodiment of the present disclosure.

As illustrated in FIG. 5, the rotor core 20 has a first gap 26 located between the magnetic poles 70N, 70S adjacent to each other in the circumferential direction. A plurality of first gaps 26 are provided along the circumferential direction. The first gap 26 is circumferentially sandwiched between the second flux barriers 52a, 52b included in the magnetic poles 70N, 70S adjacent to each other in the circumferential direction. In the example of FIG. 5, the first gap 26 is circumferentially sandwiched between the second flux barrier 52b of the magnetic pole 70N and the second flux barrier 52a of the magnetic pole 70S adjacent on the other side (−θ side) in the circumferential direction of the magnetic pole 70N. The first gap 26 extends in the radial direction.

The first gap 26 has a widened portion 26i in which the circumferential dimension increases toward the radially outside. In the example embodiment, the widened portion 26i is a radially outer portion of the first gap 26. The radially outer end of the widened portion 26i is connected to second gaps 27a, 27b located between the outer peripheral surface of the rotor core 20 and the second flux barriers 52a, 52b in the radial direction.

The second gap 27a is located between the outer peripheral surface of the rotor core 20 and the second flux barrier 52b in the radial direction, and is connected to an end on one side (+θ side) in the circumferential direction at the radially outer end of the widened portion 26i. The second gap 27a is positioned between a core recess 29e (described later) and the second flux barrier 52b in the radial direction. The second gap 27b is located between the outer peripheral surface of the rotor core 20 and the second flux barrier 52a in the radial direction, and is connected to an end on the other side (−θ side) in the circumferential direction at the radially outer end of the widened portion 26i. The second gap 27b is positioned between the core recess 29f and the second flux barrier 52a described later in the radial direction. The second gaps 27a, 27b extend in the circumferential direction. The second gaps 27a, 27b connect the first gap 26 and a portion located on the radially outer side of the pair of magnets 41a, 41b in the circumferential direction.

Edges 26a, 26b on both sides in the circumferential direction of the first gap 26 include straight portions 26c, 26f, outside connecting portions 26d, 26g, and inside connecting portions 26e, 26h when viewed in the axial direction. The edge 26a on one circumferential direction side (+θ side) of the first gap 26 is constructed with the straight portion 26c, the outside connecting portion 26d, and the inside connecting portion 26e. The edge 26b on the other circumferential direction side (−θ side) of the first gap 26 is constructed with the straight portion 26f, the outside connecting portion 26g, and the inside connecting portion 26h.

The straight portion 26c linearly extends in a direction circumferentially away from the other edge 26b of the edges 26a, 26b on both sides in the circumferential direction of the first gap 26 toward the radially outside when viewed in the axial direction. The straight portion 26c is constructed with a part of the circumferential edge portion of the widened portion 26i. The outside connecting portion 26d is bent in a direction (+θ direction) away from the radially outer end of the straight portion 26c with respect to the other edge 26b when viewed in the axial direction, and is connected to the radially inside edge of the second gap 27a. In the example embodiment, the outside connecting portion 26d has an arc shape when viewed in the axial direction.

The inside connecting portion 26e is bent in a direction away from the other edge 26b from the radially inner end of the straight portion 26c, and is connected to the radially inside edge of the accommodation hole 31b. A shape of the inside connecting portion 26e differs depending on the plate member 20a. Specifically, the plate member 20a includes the plate member 20a in which the support 28a is provided in a portion constituting the inside connecting portion 26e and the plate member 20a in which the support 28a is not provided in the portion constituting the inside connecting portion 26e. In the example embodiment, these two types of plate members 20a are alternately stacked along the axial direction. The support 28a is a portion protruding to the inside of the accommodation hole 31b. The support 28a supports the magnet 41b from the radially outside along the direction in which the magnet 41b extends when viewed in the axial direction. As described above, in the example embodiment, the inside connecting portion 26e includes the support 28a that protrudes to the inside of the accommodation hole 31b and supports the magnet 41b. For example, a part of the support 28a is provided on the straight portion 26c. In each of the above two types of the plate members 20a, a plurality of stacked bodies may be alternately stacked. That is, the stacked body in which the plurality of plate members 20a provided with the support 28a are stacked and the stacked body in which the plurality of plate members 20a not provided with the support 28a are stacked may be stacked along the axial direction.

At this point, in the example embodiment, the inner end 31g is provided with a support 28b that protrudes inside the accommodation hole 31b and supports the magnet 41b. The support 28b supports the magnet 41b from the radially inside along the direction in which the magnet 41b extends when viewed in the axial direction. Thus, the magnet 41b is supported by the pair of supports 28a, 28b from both sides in the direction in which the magnet 41b extends when viewed in the axial direction. The same applies to the magnet 41a.

A portion of the inside connecting portion 26e where the support 28a is not provided has an arc shape when viewed in the axial direction. A curvature radius of the inside connecting portion 26e is smaller than a curvature radius of the outside connecting portion 26d. In other words, the curvature radius of the outside connecting portion 26d is larger than the curvature radius of the inside connecting portion 26e. Thus, in the example embodiment, the outside connecting portion 26d is longer than the inside connecting portion 26e when viewed in the axial direction.

The straight portion 26f provided at the edge 26b is provided line-symmetrically across a center line CL2 extending in the radial direction through the center axis J and the circumferential center of the first gap 26 with respect to the straight portion 26c. The outside connecting portion 26g provided at the edge 26b is provided line-symmetrically across the center line CL2 with respect to the outside connecting portion 26d. The inside connecting portion 26h provided at the edge 26b is provided substantially line-symmetrically across the center line CL2 with respect to the inside connecting portion 26e. In the plate member 20a illustrated in the example of FIG. 5, the support 28a is provided in the inside connecting portion 26e, whereas the support 28a is not provided in the inside connecting portion 26h.

The radially outside surface of the rotor core 20 includes core recesses 29e, 29f recessed radially inside and a core protrusion 29d protruding radially outside. The core recesses 29e, 29f are provided in respective portions located radially outside the pair of second flux barriers 52a, 52b sandwiching the first gap 26 in the circumferential direction. The core recess 29e is located radially outside the second flux barrier 52b. The core recess 29f is located radially outside the second flux barrier 52*a*. The core protrusion 29*d* is located between the pair of core recesses 29*e*, 29*f* located radially outside the pair of second flux barriers 52*a*, 52*b* in the circumferential direction. For example the core recesses 29*e*, 29*f* and the core protrusion 29*d* are provided over the entire rotor core 20 in the axial direction.

The core recesses 29*e*, 29*f* extend in the circumferential direction. In the example embodiment, the radial positions of the core recesses 29*e*, 29*f* become the radially innermost side in a portion adjacent to the core protrusion 29*d* in the circumferential direction, and become the radially outside as being circumferentially separated from the portion located on the radially innermost side with respect to the core protrusion 29*d*. The inner edge shapes of the core recesses 29*e*, 29*f* extend in a curved shape when viewed in the axial direction. The pair of core recesses 29*e*, 29*f* provided with the core protrusion 29*d* sandwiched therebetween in the circumferential direction has a line-symmetrical shape with respect to the center line CL2 when viewed in the axial direction. For this reason, in the following description, only the core recess 29*e* located on one side (+θ side) in the circumferential direction as a representative of the pair of core recesses 29*e*, 29*f* may be described.

In the example embodiment, a portion of the core recess 29*e* located on the radially innermost side is located between a second virtual line IL4*a*, which passes through the center axis J and is in contact with the edge 26*a* on one side (+θ side) in the circumferential direction of the first gap 26, and a third virtual line IL4*b*, which sandwiches the second flux barrier 52*b* in the circumferential direction with the second virtual line IL4*a* to pass through the center axis J and is in contact with the edge of the second flux barrier 52*b*, when viewed in the axial direction. In the example embodiment, the third virtual line IL4*b* passes through a corner located on the other side (−θ side) in the circumferential direction and on the radially outside of the corner of the magnet 41*b* when viewed in the axial direction.

In the example embodiment, a portion of the core recess 29*e* located on the radially innermost side is located closer to the core protrusion 29*d* adjacent to the core recess 29*e* with respect to a fourth virtual line IL4*c* that passes through the center axis J and bisects the second virtual line IL4*a* and the third virtual line IL4*b* in the circumferential direction when viewed in the axial direction. In the example embodiment, the portion of the core recess 29*e* located on the radially innermost side is located on the other side (−θ side) in the circumferential direction with respect to the fourth virtual line IL4*c*.

In the example embodiment, when viewed in the axial direction, a circumferential distance between the portions where the pair of first virtual lines IL3*a*, IL3*b* extending while overlapping the respective straight portions 26*c*, 26*f* provided at the edges 26*a*, 26*b* on both sides in the circumferential direction of the first gap 26 intersect the radially outside surface of the rotor core 20 is the same as the circumferential dimension in the radially outside surface of the core protrusion 29*d*. When viewed in the axial direction, the first virtual line IL3*a* extends along the straight portion 26*c*, and passes through an end on one side (+θ side) in the circumferential direction in the radially outside surface of the core protrusion 29*d*. When viewed in the axial direction, the first virtual line IL3*b* extends along the straight portion 26*f*, and passes through an end on the other side (−θ side) in the circumferential direction in the radially outside surface of the core protrusion 29*d*.

The edges on both sides in the circumferential direction of the core protrusion 29*d* include connecting portions 29*c* connected to the radially outside edges of the second gaps 27*a*, 27*b*. The connecting portion 29*c* constitutes a part of the edges of the core recesses 29*e*, 29*f*. In the example embodiment, the connecting portion 29*c* has an arc shape recessed radially inside when viewed in the axial direction. The curvature radius of the connecting portion 29*c* is smaller than the curvature radius of the outside connecting portion 26*d*. In other words, the curvature radius of the outside connecting portion 26*d* is larger than the curvature radius of the connecting portion 29*c*. Accordingly, the outside connecting portion 26*d* is longer than the connecting portion 29*c* when viewed in the axial direction.

The plurality of core protrusions 29*d* and the plurality of core recesses 29*e*, 29*f* are provided along the circumferential direction. The core protrusion 29*d* and the pair of core recesses 29*e*, 29*f* are provided for each first gap 26.

Because the core recesses 29*e*, 29*f* and the core protrusion 29*d* are provided, the radially outside surface of the rotor core 20 has a shape including a first circular arc 29*a* and a second circular arc 29*b* when viewed in the axial direction. The first circular arc 29*a* is a radially outside surface of a portion having the maximum radius of the rotor core 20. The first circular arc 29*a* extends in an arcuate shape centered on the center axis J when viewed in the axial direction. In the example embodiment, the first circular arc 29*a* is formed by the radially outside surface of the core protrusion 29*d*.

The second circular arc 29*b* extends in an arcuate shape having a curvature radius different from that of the first circular arc 29*a* when viewed in the axial direction. The curvature radius of the second circular arc 29*b* is smaller than the curvature radius of the first circular arc 29*a*. The magnetic pole center line CL1 passes through the circumferential center of the second circular arc 29*b* when viewed in the axial direction. The radial position at the circumferential center of the second circular arc 29*b* is the same as the radial position of the first circular arc 29*a*. That is, the radius of the rotor core 20 becomes the maximum even in the circumferential center of the second circular arc 29*b*.

A plurality of first circular arcs 29*a* and a plurality of second circular arcs 29*b* are provided. The first circular arc 29*a* and the second circular arc 29*b* are alternately provided along the circumferential direction. In the example embodiment, the core recesses 29*e*, 29*f* are provided at both circumferential ends of the second circular arc 29*b*, respectively.

Figure 6:
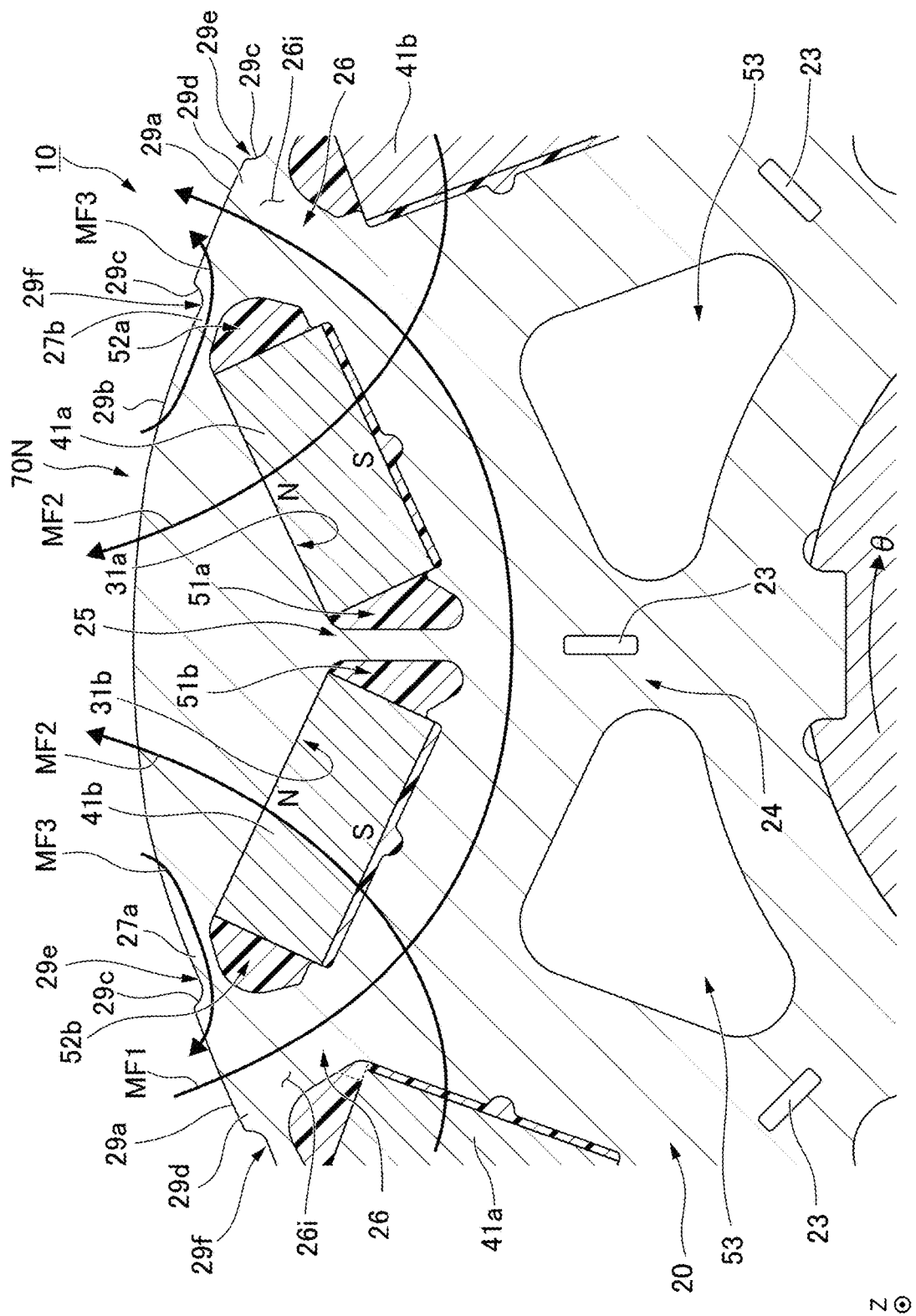
FIG. 6 is a sectional view illustrating a flow of a magnetic flux in a rotor of an example embodiment of the present disclosure.

As illustrated in FIG. 6, magnetic fluxes MF1, MF3, which pass from the stator 60 through the rotor core 20 and return to the stator 60 again, are generated are generated when power is supplied to the stator 60. The magnetic flux MF1 is a magnetic flux passing between the pair of magnets 41*a*, 41*b* and the third flux barrier 53 in the radial direction. The magnetic flux MF1 flows into the rotor core 20 from the first circular arc 29*a*, and flows in a curved shape protruding radially inside between the pair of magnets 41*a*, 41*b* and the third flux barrier 53 in the radial direction. The magnetic flux MF1 flowing between the pair of magnets 41*a*, 41*b* and the third flux barrier 53 in the radial direction flows out of the rotor core 20 from the first circular arc 29*a* adjacent to the first circular arc 29*a* with the second circular arc 29*b* interposed therebetween, and returns to the stator 60. The magnetic flux MF3 flows into the rotor core 20 from the second circular arc 29*b*, passes through the second gaps 27*a*, 27*b*, and returns to the stator 60 from the first circular arc 29*a*.

In addition, the magnet 40 generates a magnetic flux MF2 flowing between the rotor core 20 and the stator 60. The magnetic flux MF2 passes through the magnets 41*a*, 41*b*, which are provided in the different magnetic poles 70 and disposed adjacent to each other at intervals in the circumferential direction in the radial direction. The magnetic flux MF2 flows in the rotor core 20 in a curved shape protruding inside in the radial direction. In the example of FIG. 6, the magnetic flux MF2 flows out of the rotor core 20 from the second circular arc 29b, and flows to the stator 60.

According to the example embodiment, the caulking portion 23 is located in the first region 24 between the through-holes 32 adjacent to each other in the circumferential direction. At this point, the through-hole 32 (third flux barrier 53) is a portion through which a magnetic flux hardly passes. For this reason, the first region 24 between the through-holes 32 in the circumferential direction hardly become a magnetic path through which the magnetic flux passes. Thus, when being provided in the first region 24, the caulking portion 23 hardly obstructs the magnetic flux flowing in the rotor core 20. Specifically, when the caulking portion 23 is provided in the first region 24, the magnetic flux MF1 in FIG. 6 can be prevented from being obstructed by the caulking portion 23. In addition, the caulking portion 23 having a relatively high magnetic resistance can prevent the magnetic flux MF1 from leaking radially inside from between the through-holes 32. Thus, the decrease in magnetic efficiency of the rotary electric machine 1 can be prevented.

For example, the portion where the through-hole 32 (third flux barrier 53) is made tends to have a mass smaller than that of other portions of the rotor core 20 by making a hole penetrating the rotor core 20 in the axial direction. For this reason, weight of the rotor core 20 can be reduced by providing the through-hole 32.

For example, in the portion where the through-hole 32 (third flux barrier 53) is made rigidity tends to be lowered because the through-hole 32 penetrating the rotor core 20 in the axial direction is made. On the other hand, the rigidity tends to be higher than that of other portions of the rotor core 20 because a part of the caulking portion 23 is caulked in the axial direction. For this reason, a portion of the rotor core 20 where the rigidity is likely to decrease can be reinforced by providing the caulking portion 23 in the first region 24 between the through-holes 32.

When the rotor 10 rotates, stress in the circumferential direction easily occurs in the first region 24. In particular, when the rigidity of the rotor core 20 decreases in a periphery of the first region 24 by making the through-hole 32 axially penetrating the rotor core 20 as in the example embodiment, torsional stress in the circumferential direction easily occurs in the first region 24. On the other hand, because a portion of the rotor core 20 where the rigidity is likely to decrease by providing the caulking portion 23 in the first region 24, deformation or the like of the first region 24 can be prevented even when the stress in the circumferential direction is generated.

In addition, the first region 24 between the through-holes 32 (third flux barrier 53) is a relatively wide region that can be easily secured in the rotor core 20. For this reason, suitably the caulking portion 23 is easily provided in the first region 24. Thus, the plate members 20a can be suitably fixed to each other by the caulking portion 23.

According to the example embodiment, at least a part of the caulking portion 23 is located radially inside the radial center of the first region 24. For this reason, the caulking portion 23 can be easily disposed radially inside, and the caulking portion 23 can more hardly obstruct the magnetic flux MF1. Thus, the decrease in the magnetic efficiency of the rotary electric machine 1 can be further prevented.

According to the example embodiment, the caulking portion 23 is disposed radially inside in the first region 24. For this reason, the caulking portion 23 can more hardly obstruct the magnetic flux MF1. Thus, the decrease in the magnetic efficiency of the rotary electric machine 1 can be further prevented.

According to the example embodiment, the caulking portion 23 extends in the radial direction when viewed in the axial direction. For this reason, the circumferential dimension of the caulking portion 23 is easily relatively reduced. Thus, the interval between the through-holes 32 is easily reduced while the interval between the caulking portion 23 and the through-hole 32 (third flux barrier 53) is ensured in the circumferential direction. Consequently, the through-hole 32 is easily enlarged while strength is secured in the first region 24. For this reason, the magnetic flux MF1 can be prevented from leaking radially inside from between the through-holes 32 while the strength of the rotor core 20 is secured. For this reason, the decrease in the magnetic efficiency of the rotary electric machine 1 can be further prevented. In addition, the weight of the rotor core 20 can be further reduced because the through-hole 32 is enlarged.

According to the example embodiment, the caulking portion 23 is located radially inside a second region 25 located between the radially inner ends of the pair of accommodation holes 31a, 31b. The second region 25 tends to be relatively narrow, and the rigidity tends to be relatively small. For this reason, the rigidity of the second region 25 can be easily reinforced by providing the caulking portion 23 on the radially inside of the second region 25. The plate members 20a can be suitably fixed to each other by the caulking portion 23 because the caulking portion 23 is disposed while avoiding the relatively narrow second region 25.

According to the example embodiment, when viewed in the axial direction, at least a part of the caulking portion 23 is located between the first virtual line IL1a along the radially inside edge of the accommodation holes 31a in parallel with the direction in which the accommodation hole 31a in the pair of accommodation holes 31a, 31b extends and the second virtual line IL1b that is in parallel with the first virtual line IL1a and in contact with the edge of the through-hole 32 (third flux barrier 53) from the radially outside. For this reason, the caulking portion 23 can more hardly obstruct the magnetic flux MF1. Thus, the decrease in the magnetic efficiency of the rotary electric machine 1 can be further prevented.

According to the example embodiment, at least a part of the caulking portion 23 is located radially inside the third virtual line IL1c that extends in parallel with the first virtual line IL1a and the second virtual line IL1b and bisects the first virtual line IL1a and the second virtual line IL1b when viewed in the axial direction. For this reason, the caulking portion 23 can be more easily disposed on the radially inside, and the caulking portion 23 can more hardly obstruct the magnetic flux MF1. Thus, the decrease in the magnetic efficiency of the rotary electric machine 1 can be further prevented.

According to the example embodiment, the caulking portion 23 is provided for each of the plurality of first regions 24. For this reason, the plate members 20a can be more firmly fixed to each other.

According to the example embodiment, the caulking portion 23 includes the caulking portion 23 located on the radially outside of the protrusion 22. For this reason, even when the stress in the circumferential direction is applied to the portion where the protrusion 22 is provided during the rotation of the rotor 10, peeling of the plate members 20a from each other is easily prevented by the caulking portion 23 located on the radially outside of the protrusion 22. Even when the protrusion 22 is press-fitted into the recess 11a, the peeling of the plate members 20a from each other is easily prevented during the press-fitting of the protrusion 22.

According to the example embodiment, because the core recesses 29e, 29f are provided, the magnetic flux flowing between the portion where the core recesses 29e, 29f are provided and the stator 60 in the radial direction can be decreased. Thus, suitably the magnetic flux MF3 in FIG. 6 can be easily flown. Consequently, the generation of the unnecessary flow of the magnetic flux can be prevented between the rotor core 20 and the stator 60, and a torque ripple can be reduced.

In addition, according to the example embodiment, the first gap 26 includes the widened portion 26i in which the circumferential dimension increases toward the radially outside. The radially outer end of the widened portion 26i is connected to the second gaps 27a, 27b located between the core recesses 29e, 29f and the second flux barriers 52a, 52b in the radial direction. For this reason, the circumferential width of the radially outer end of the widened portion 26i connected to the second gaps 27a, 27b can be relatively large, and the stress can be easily dispersed in the widened portion 26i. Thus, concentration of the stress on the second gaps 27a, 27b can be prevented. Consequently, the deformation and damage of the second gaps 27a, 27b can be prevented while the torque ripple is reduced by providing the core recesses 29e, 29f. In this way, according to the example embodiment, the rigidity of the rotor core 20 can be improved. In addition, the magnetic flux can easily flow through the first gap 26 because the circumferential width of the widened portion 26i can be made relatively large. Specifically, suitably the magnetic flux MF1 in FIG. 6 can easily flow. Thus, the magnetic efficiency of the rotary electric machine 1 can be improved.

According to the example embodiment, the outside connecting portions 26d, 26g are longer than the inside connecting portions 26e, 26h when viewed in the axial direction. For this reason, the stress can be more easily dispersed in the outside connecting portions 26d, 26g than in the inside connecting portions 26e, 26h. Thus, the concentration of the stress on the second gaps 27a, 27b can further prevented. In addition, the circumferential dimension of the first gap 26 can be more easily increased in the outside connecting portions 26d, 26g than in the inside connecting portions 26e, 26h. Thus, the rigidity of the rotor core 20 is easily increased in the radially outside where the generated stress tends to increase. Consequently, the rigidity of the rotor core 20 can be further improved.

In addition, according to the example embodiment, the inside connecting portions 26e, 26h include the support 28a that protrudes to the inside of the accommodation hole 30 to support the magnet 40. For this reason, the circumferential dimension of the first gap 26 can be increased in the portion where the support 28a is provided in the inside connecting portions 26e, 26h. For this reason, the rigidity of the radially inside of the first gap 26 can be improved. Consequently, the rigidity of the rotor core 20 can be further improved.

According to the example embodiment, when viewed in the axial direction, the circumferential distance between the portions where the pair of first virtual lines IL3a, IL3b extending while overlapping the respective straight portions 26c, 26f provided at the edges 24a, 24b on both sides in the circumferential direction of the first gap 26 intersect the radially outside surface of the rotor core 20 is the same as the circumferential dimension of the radially outside surface of the core protrusion 29d. For this reason, the magnetic flux MF1 passing through the radially outside surface of the core protrusion 29d, namely, the first circular arc 29a can sufficiently flow to the first gap 26. Thus, the magnetic efficiency of the rotary electric machine 1 can be improved.

In addition, according to the example embodiment, the edges on both sides in the circumferential direction of the core protrusion 29d include the connecting portion 29c connected to the radially outside edges of the second gaps 27a, 27b. The outside connecting portions 26d, 26g are longer than the connecting portion 29c when viewed in the axial direction. For this reason, the stress can be more easily dispersed in the outside connecting portions 26d, 26g. Thus, the concentration of the stress on the second gaps 27a, 27b can further prevented.

According to the example embodiment, the radially outside surface of the rotor core 20 includes the first circular arc 29a and the second circular arc 29b. The core recesses 29e, 29f are provided at both ends in the circumferential direction of the second circular arc 29b. With such the shape, the magnetic flux MF3 in FIG. 6 can more suitably flow. Thus, the torque ripple can be further reduced.

According to the example embodiment, the portion of the core recess 29e located on the radially innermost side is located between the second virtual line IL4a, which passes through the center axis J and is in contact with the edge 26a on one side in the circumferential direction of the first gap 26, and the third virtual line IL4b, which sandwiches the second flux barrier 52b in the circumferential direction with the second virtual line IL4a to pass through the center axis J and is in contact with the edge of the second flux barrier 52b, when viewed in the axial direction. For this reason, the second gap 27a located on the radially outside of the second flux barrier 52b can be easily separated radially inside from the stator 60, and the magnetic flux MF3 can be prevented from leaking radially outside from the second gap 27a. Thus, the torque ripple can be further reduced.

According to the example embodiment, the portion of the core recess 29e located on the radially innermost side is located closer to the core protrusion 29d adjacent to the core recess 29e than the fourth virtual line IL4c that passes through the center axis J to bisect the second virtual line IL4a and the third virtual line IL4b in the circumferential direction when viewed in the axial direction. Thus, the magnetic flux MF3 hardly leak radially outward at a portion adjacent to the core protrusion 29d in the circumferential direction. Consequently, the torque ripple can be more suitably reduced.

The present disclosure is not limited to the above-described example embodiment, and other structures may be adopted in other example embodiments of the present disclosure within the scope of the technical idea of the present disclosure. The caulking portion may be disposed at any position. The shape of the caulking portion is not particularly limited. The caulking portion may have a circular shape or a polygonal shape other than a quadrangular shape when viewed in the axial direction. The caulking portion may not be provided.

Figure 7:
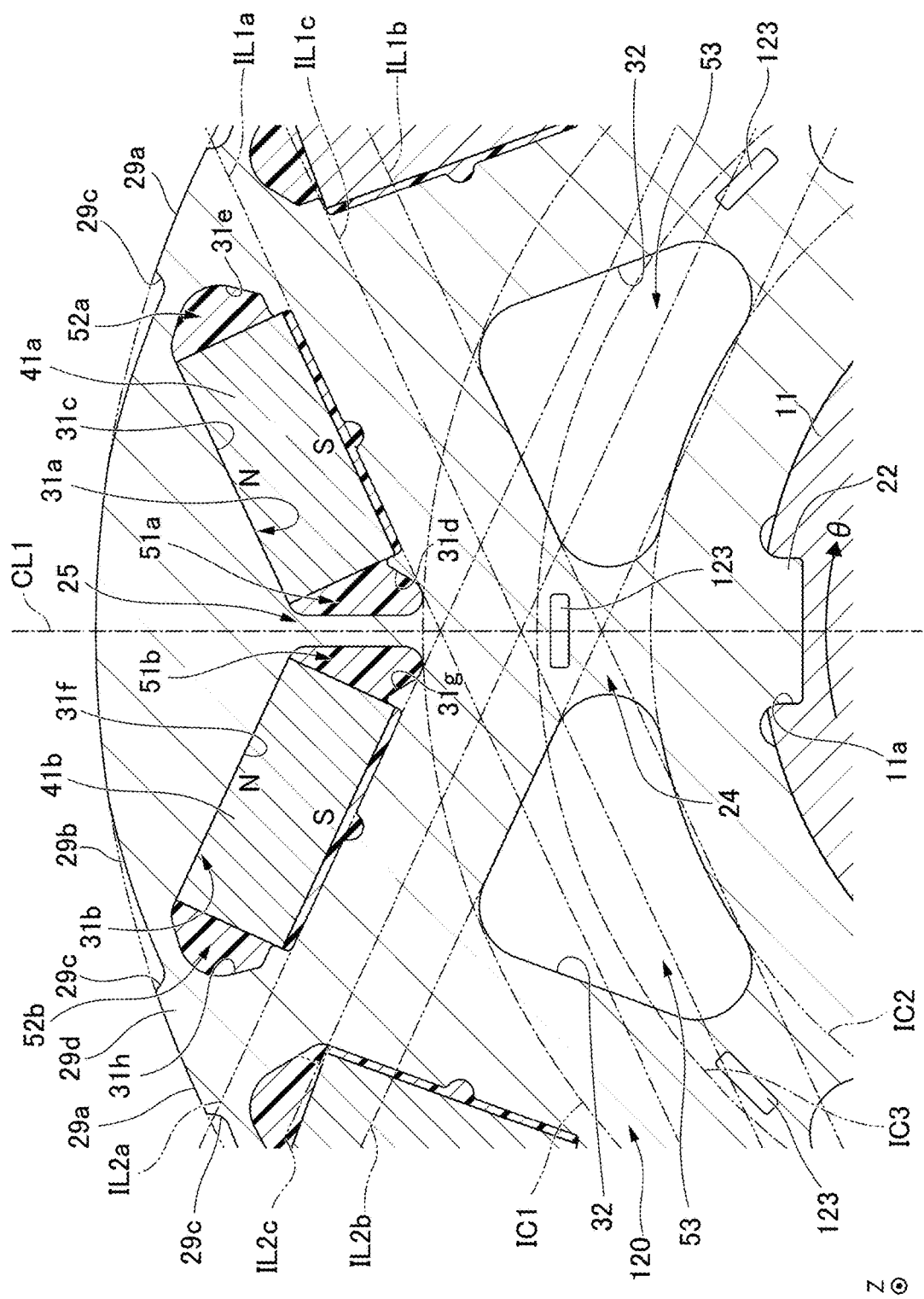
FIG. 7 is a sectional view illustrating a caulking portion according to a modification of an example embodiment of the present disclosure.

Like the caulking portion 123 of the rotor core 120 in FIG. 7, the caulking portion may extend in a direction intersecting the radial direction when viewed in the axial direction. According to this configuration, the circumferential dimension of the caulking portion 123 can be relatively increased. For this reason, the caulking portion 123 having the relatively high magnetic resistance can prevent the magnetic flux MF1 from leaking radially inside from between the through-holes 32 (third flux barrier 53). In addition, the caulking portion 123 can be further prevented from obstructing the flow of the magnetic flux MF1 because the radial dimension of the caulking portion 123 is made relatively small. Thus, the decrease in the magnetic efficiency of the rotary electric machine can be further prevented. For example, the caulking portion 123 has a rectangular shape extending in the circumferential direction orthogonal to the radial direction in which the magnetic pole center line CL1 extends. The entire caulking portion 123 is located radially inside the virtual circle IC3.

The plurality of through-holes (third flux barriers 53) disposed at intervals in the circumferential direction may have any shape. The plurality of through-holes may have a polygonal shape of a square or more, a circular shape, or an elliptical shape when viewed in the axial direction.

The first gap may have any shape as long as the first gap has the widened portion. In the first gap, the outside connecting portion and the inside connecting portion may be linear when viewed in the axial direction. When viewed in the axial direction, the circumferential distance between portions where the pair of first virtual lines extending while overlapping each of the straight portions provided at the edges on both sides in the circumferential direction of the first gap intersects the radially outside surface of the rotor core may be larger than the circumferential dimension of the radially outside surface of the core protrusion.

At least three magnets may be disposed in each magnetic pole. For example, the magnet, which is located radially outside the magnets 41a, 41b and extending in the direction orthogonal to the radial direction when viewed in the axial direction, may be arranged in each magnetic pole in addition to the pair of magnets 41a, 41b of the above-described example embodiment. In this case, in each magnetic pole, three magnets are arranged along a ∇ shape when viewed in the axial direction. Furthermore, a pair of magnets, which is located on the radially outsides of the magnets 41a, 41b and extends in directions away from each other in the circumferential direction from the radially inside toward the radially outside when viewed in the axial direction may be further disposed in addition to the magnets 41a, 41b. That is, two pairs of magnets arranged along the V-shape expanding in the circumferential direction toward the radially outside may be arranged side by side in the radial direction.

The protrusion and the recess provided in the shaft and the central hole may be provided opposite to those in the above-described example embodiment. That is, the central hole may have a recess, and the shaft may have a protrusion fitted into the recess. The recess and the protrusion may not be provided.

The rotary electric machine applied to the present disclosure is not limited to the motor, and may be a generator. An application of the rotary electric machine is not limited. For example, the rotary electrical machine may be mounted on a vehicle or a device other than the vehicle. Features as described above in the specification may be appropriately combined as long as no conflict arises.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor rotatable about a central axis extending in an axial direction, the rotor comprising:
    a shaft extending in the axial direction;
    a rotor core that includes accommodation holes and is fixed to the shaft; and
    magnets accommodated in the plurality of accommodation holes; wherein
    the accommodation holes include a pair of accommodation holes at intervals in a circumferential direction;
    the pair of accommodation holes extend in a directions away from each other in the circumferential direction from a radially inside toward a radially outside when viewed in the axial direction;
    the magnets include a pair of magnets accommodated in the pair of accommodation holes;
    the pair of magnets extend in the directions away from each other in the circumferential direction from the radially inside toward the radially outside when viewed in the axial direction;
    a flux barrier is provided on the radially outside of the magnet along a direction in which the magnet extends when viewed in the axial direction with respect to each of the pair of magnets in the pair of accommodation holes;
    magnetic poles including the pair of magnets and the flux barrier are provided along the circumferential direction;
    the rotor core includes a first gap located between the magnetic poles that are adjacent to each other in the circumferential direction;
    the first gap is circumferentially sandwiched between the flux barriers included in the magnetic poles that are adjacent to each other in the circumferential direction;
    a radially outside surface of the rotor core includes:
        a core recess provided in each of portions located on the radially outsides of the pair of flux barriers sandwiching the first gap in the circumferential direction; and
        a core protrusion located between a pair of the core recesses located radially outside the pair of flux barrier portions in the circumferential direction;
    the first gap includes a widened portion in which a circumferential dimension increases toward the radially outside;
    a radially outer end of the widened portion is connected to a second gap located between the core recess and the flux barrier in the radial direction;
    edges on both sides of the first gap in the circumferential direction as viewed in the axial direction include:
        a straight portion extending in a direction circumferentially away from another edge of the edges on two sides in the circumferential direction of the first gap toward the radially outside;
        an outside connecting portion that is bent in a direction away from the other edge from a radially outer end of the straight portion and is connected to a radially inside edge of the second gap; and
        an inside connecting portion that is bent in a direction away from the other edge from a radially inner end of the straight portion and is connected to a radially inside edge of the accommodation hole; and
    the outside connecting portion is longer than the inside connecting portion when viewed in the axial direction.

2. The rotor according to claim 1, wherein the inside connecting portion includes a support that protrudes inside the accommodation hole and supports the magnet.

3. The rotor according to claim 1, wherein when viewed in the axial direction, a circumferential distance between portions where a pair of first virtual lines extending while overlapping each of the straight portions provided at the edges on both sides in the circumferential direction of the first gap intersects the radially outside surface of the rotor core is the same as the circumferential dimension of the radially outside surface of the core protrusion or larger than the circumferential dimension of the radially outside surface of the core protrusion.

4. The rotor according to claim 1, wherein
edges on two sides in the circumferential direction of the core protrusion include a connecting portion connected to a radially outside edge of the second gap; and
the outside connecting portion is longer than the connecting portion when viewed in the axial direction.

5. The rotor according to claim 1, wherein
a radially outside surface of the rotor core includes:
a first circular arc that is a radially outside surface of a portion of the rotor core having a maximum radius and extends in an arc shape centered on the center axis when viewed in the axial direction; and
a second circular arc extending in an arc shape having a curvature radius different from a curvature radius of the first circular arc when viewed in the axial direction; and
the core recess is provided at two circumferential ends of the second circular arc.

6. The rotor according to claim 1, wherein a portion of the core recess located on a radially innermost side is located between a second virtual line that passes through the center axis and is in contact with an edge on one side in the circumferential direction of the first gap and a third virtual line that sandwiches the flux barrier between the second virtual line and the third virtual line in the circumferential direction to pass through the center axis and is in contact with an edge of the flux barrier when viewed in the axial direction.

7. The rotor according to claim 6, wherein a portion of the core recess located on the radially innermost side is located closer to the core protrusion adjacent to the core recess than a fourth virtual line that passes through the center axis and bisects the second virtual line and the third virtual line in the circumferential direction when viewed in the axial direction.

8. A rotary electric machine comprising:
the rotor according to claim 1; and
a stator radially outside of the rotor.

\* \* \* \* \*